US012809849B1

(12) United States Patent
Mundra et al.

(10) Patent No.: US 12,809,849 B1
(45) Date of Patent: Nov. 24, 2026

(54) COMMUNICATION CHANNEL TO PROPAGATE UPDATES BETWEEN A DATABASE TABLE AND A DATABASE INDEX

(71) Applicant: Amazon Technologies, Inc., Seattle, WA (US)

(72) Inventors: Sagar Mundra, East Palo Alto, CA (US); Carlos Humberto Hasan Valdovino, Seattle, WA (US); Somasundaram Perianayagam, Seattle, WA (US); Sharatkumar Nagesh Kuppahally, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/618,206

(22) Filed: Mar. 27, 2024

(51) Int. Cl.
*G06F 16/23* (2019.01)

(52) U.S. Cl.
CPC ...... *G06F 16/2365* (2019.01); *G06F 16/2379* (2019.01)

(58) Field of Classification Search
CPC .......................... G06F 16/2365; G06F 16/2379
See application file for complete search history.

(56) References Cited

U.S. PATENT DOCUMENTS

| | | | | |
|---|---|---|---|---|
| 6,253,212 | B1 * | 6/2001 | Loaiza | G06F 11/1402 |
| 6,581,075 | B1 * | 6/2003 | Guturu | G06F 16/273 |
| 7,263,536 | B1 * | 8/2007 | Pederson | G06F 16/2228 707/999.203 |
| 8,645,397 | B1 * | 2/2014 | Koudas | G06F 16/2272 707/750 |
| 10,860,604 | B1 * | 12/2020 | Pandey | G06F 11/1402 |
| 11,314,717 | B1 * | 4/2022 | Certain | G06F 16/2308 |
| 11,880,385 | B1 | 1/2024 | Kuppahally et al. | |
| 2010/0082630 | A1 * | 4/2010 | Zagelow | G06F 16/2272 707/741 |
| 2014/0222872 | A1 * | 8/2014 | Rambo | G06F 16/23 707/803 |
| 2016/0261727 | A1 * | 9/2016 | Yang | G06F 11/2035 |
| 2018/0253467 | A1 * | 9/2018 | Gurajada | G06F 11/1471 |
| 2022/0164366 | A1 * | 5/2022 | Kuppahally | G06F 16/27 |
| 2025/0077501 | A1 * | 3/2025 | Jiménez Peris | G06F 16/2329 |

OTHER PUBLICATIONS

U.S. Appl. No. 17/037,507, filed Sep. 29, 2020, "Ordering Updates to Secondary Indexes Using Conditional Operations."

* cited by examiner

*Primary Examiner* — Charles Rones
*Assistant Examiner* — Mohammad S Bhuyan
(74) *Attorney, Agent, or Firm* — Davis Wright Tremaine LLP

(57) ABSTRACT

Apparatuses, systems, methods, and techniques for managing propagation of updates from a database table to a database index. After an update is applied to a table, the update is stored in multiple storage locations associated with the database table. An update stored in a first storage location may be removed and applied to a database index when a version associated with a portion of the database index satisfies a comparison with a version identifier associated with the update. Updates stored in a second storage location may be ordered according to their respective version identifiers, and an update may be removed from the second storage location after the update is applied to the database index. In some implementations, when applying the update to the database index is unsuccessful, the update may be reapplied to the database index after a period of time.

20 Claims, 8 Drawing Sheets

COMMUNICATION CHANNEL TO PROPAGATE UPDATES BETWEEN A DATABASE TABLE AND A DATABASE INDEX

BACKGROUND

Propagating updates made to a database table to an index, such as a secondary index, can require substantial computing resources because may techniques maintain a significant amount of state information (e.g., for each index partition). The state information helps ensure that data stored by the index corresponds to or matches data stored by the table. Computing resources and/or costs required to propagate updates from a database table to a database index and/or methods that help ensure correctness of the data stored by the database index may be improved.

BRIEF DESCRIPTION OF THE DRAWINGS

Various techniques will be described with reference to the drawings, in which.

DETAILED DESCRIPTION

Figure 1:
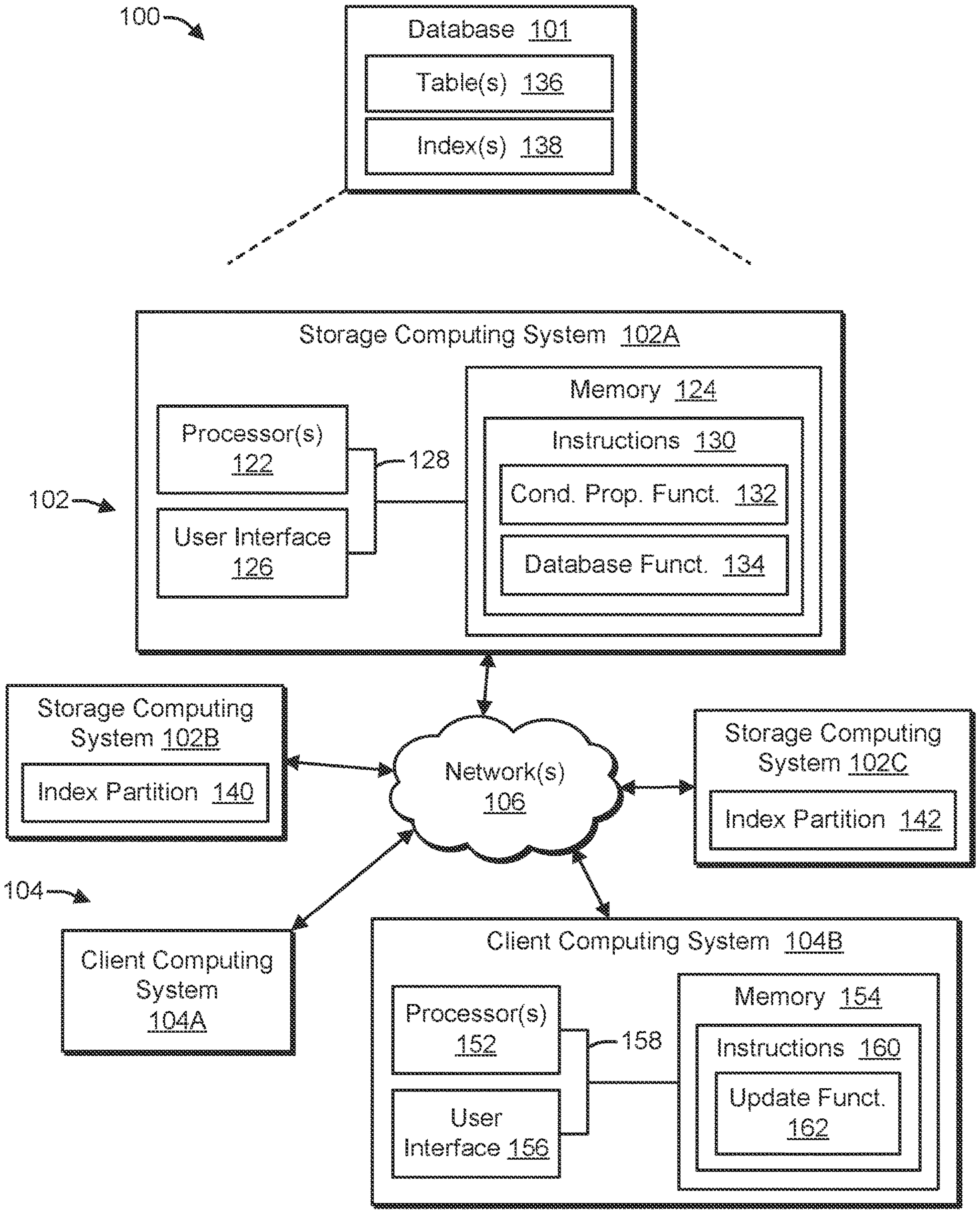
FIG. 1 illustrates a block diagram illustrating an example system implementing a database, in accordance with at least one embodiment.

Database indexes, such as global secondary indexes ("GSIs"), may each belong to a database table, which is referred to as a base table for that index. When a table is updated, that update is propagated to any indexes belonging to the table. A quadratic architecture may be used to maintain quadratic state (e.g., state information for each table partition and index partition pair) necessary to propagate updates from a table partition to an index partition of a GSI. But the quadratic architecture may require a large number of computing devices that increased non-linearly as size of the table(s) and index(es) increase. For example, if the index and its base table double in size, instead of requiring twice the capacity to propagate updates, the quadratic architecture could require four times the capacity (e.g., four times the number of computing devices) to maintain propagation because of the number of in memory states maintained by the quadratic architecture.

Instead of using a quadratic architecture to implement database indexes, database indexes may be implemented using a horizontally scalable architecture that maintains a single state for each table partition and index pair. The horizontally scalable architecture may be particularly useful for very large indexes belonging to very large base tables. Thus, if the index and its base table double in size, the horizontally scalable architecture may require only twice the capacity to propagate update.

The index partitions of the quadratic architecture each includes a separate receive buffer for one or more table partitions. But, the horizontally scalable architecture, which does not store state information for the index partitions, omits the receive buffer(s). Instead, the horizontally scalable architecture includes a communication channel between each table partition and index pair. The communication channel includes a set of storage locations or buffers that may include a send buffer, a wait buffer, and/or an ordered buffer. Thus, state is maintained per index (not per index partition) on the sending side of the communication channel.

After an update is applied to a table, the update is stored in both the send and ordered buffers. Propagation functionality removes the update from the send buffer, and checks one or more conditions before attempting to apply the update to the index. The condition(s) help ensure that older information (e.g., included in the update) does not overwrite newer information stored by one or more item stored by the index. If the condition(s) is/are not satisfied, the propagation functionality may ignore or discard the update and remove the update from the ordered buffer. If the condition(s) is/are satisfied, the propagation functionality attempts to apply the update to the index. If the attempt is successful, the update is removed from the ordered buffer. On the other hand, if the attempt is unsuccessful, the update is stored in the wait buffer for a wait time before the propagation functionality removes the update from the wait buffer and repeats the attempt to apply the update to the index again. If the update remains in the ordered buffer too long, the propagation functionality may cause the database to perform one or more corrective actions. In at least one embodiment, the corrective action(s) may include resending the update to the send buffer, and/or causing the update to be resent to the send buffer so that the propagation functionality may retry applying the update to the index. In at least one embodiment, the corrective action(s) may include the propagation functionality resetting the communication channel between the table and the index, and/or causing the communication channel to be reset (e.g., by the database). In at least one embodiment, the corrective action(s) may include the propagation functionality notifying an operator (e.g., an engineer) to perform a manual intervention, and/or causing the operator to be notified. An example of such a manual intervention includes transiently scaling the index (e.g., increasing throughput capacity to drain the pending update). In at least one embodiment, the corrective action(s) may include performing another type of corrective action, and/or causing another type of corrective action to be performed.

If the database splits a particular table partition into two or more new table partitions, the propagation functionality may create, for each of the new table partitions, a copy of the original communication channel created for the particular table partition. The newly created communication channels are copies of the original communication channel. In this manner, states associated with the particular table partition are also associated with the new table partitions. Further, any states associated with the original communication channel are also associated with the new communication channels. If duplicating the original communication channel causes a duplicate update to be stored in the send buffers the new communication channels, checking the condition(s) will cause any updates already applied to the particular index to be discarded or ignored, which helps ensure correctness.

If the database splits a particular index partition into two or more new index partitions, the propagation functionality need not generate new communication channels or state information. The communication protocol used to communicate between the table partition(s) and the index identifies the index partition that is to be updated. Therefore, the propagation functionality is able to route updates to the correct index partitions.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a block diagram illustrating an example system 100 implementing a database 101, in accordance with at least one embodiment. In at least one embodiment, the system 100 includes one or more storage computing systems 102 connected to one or more client computing systems 104 by one or more networks 106. In the embodiment illustrated, the storage computing system(s) 102 include three storage computing systems 102A, 102B, and 102C. However, this is not a requirement and the storage computing system(s) 102 may include any number of storage computing systems, including a single storage computing system. In the embodiment illustrated, the client computing system(s) 104 include two client computing systems 104A and 104B. However, this is not a requirement and the client computing system(s) 104 may include any number of storage computing systems, including a single client computing system.

The storage computing system(s) 102, the client computing system(s) 104, and/or the network(s) 106 may implement the database 101. The database 101 may be implemented by the system 100 as a service. The database 101 may be implemented as a distributed database. The database 101 may be a non-relational ("NoSQL") database, a relational database, and/or another type of database that stores collections of items (e.g., tables that include items). At least a portion of the database 101 may be stored on each of at least a portion of the storage computing systems 102A, 102B, and 102C. Elements of the database 101 may communicate with one another over the network(s) 106. Elements (e.g., one or more tables, one or more indexes, and/or the like) of the database 101 may be implemented over the network(s) 106 by the storage computing system(s) 102 and/or the client computing system(s) 104. The elements of the database 101 may include one or more data sets, such as one or more tables 136, one or more indexes 138, and/or the like.

The system 100 may be implemented in a single location or may include numerous data centers hosting various resource pools, such as collections of physical and/or virtualized computer servers, storage devices, networking equipment and the like (e.g., a computing system 900 illustrated in FIG. 9)), needed to implement and distribute the infrastructure and storage services offered by the system 100.

Figure 9:
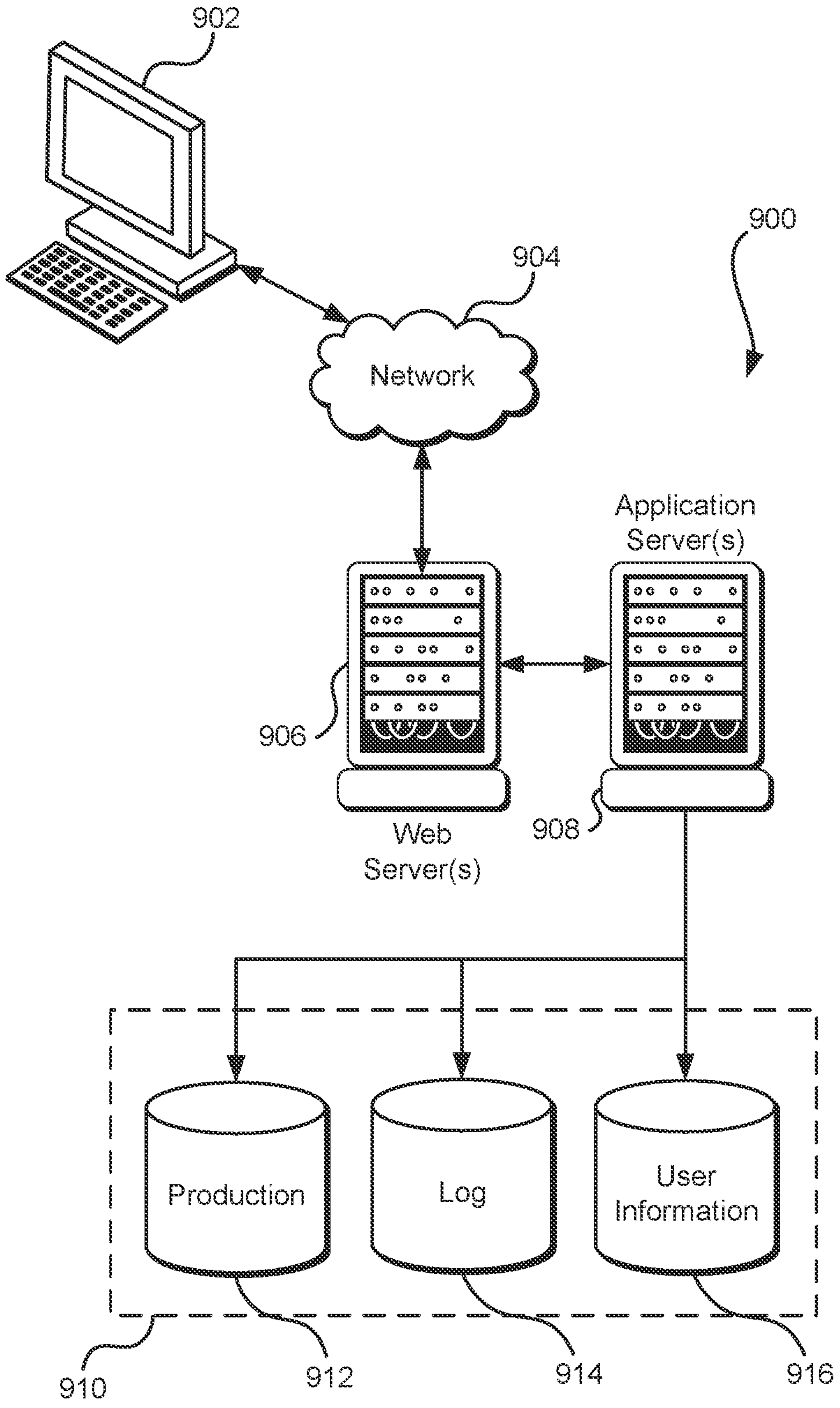
FIG. 9 illustrates a system in which various embodiments can be implemented.

Each of the storage computing system(s) 102 may be implemented using one or more computing devices, such as a system 900 (see FIG. 9). Each of the storage computing system(s) 102 may include one or more processors 122, memory 124, and a user interface 126. The memory 124 (e.g., one or more non-transitory processor-readable medium) stores machine executable instructions 130 that when performed by processor(s) 122 implement conditional propagation functionality 132 and/or database functionality 134. At least a portion of the storage computing system(s) 102 each store at least a portion of one or more data sets (e.g., the table(s) 136, the index(es) 138, and/or the like) stored by the database 101. In at least one embodiment, one or more of the storage computing system(s) 102 may implement one or more services related to the database 101 but may not store any portions of the data set(s).

The database functionality 134 may implement at least a portion of the database 101. A partition is a distinct independent part or portion of the database 101 or one of its constituent elements. For example, one of the table(s) 136, one of the index(es) 138, and/or the like may be divided or partitioned into two or more separate partitions. Different partitions may be stored on different computing hardware and/or many be implemented by different instances of the database functionality 134. For example, each of the storage computing systems 102A, 102B, and 102C may implement a different instance of the database functionality 134 that may control access to one or more partitions of the database 101 (e.g., stored in the memory 124). The database functionality 134 may store at least one partition of the table(s) 136 and/or at least one partition of the index(es) 138 in the memory 124 and/or in another memory. For example, the database functionality 134 of the storage computing system 102A may store one or more partitions of a particular one of the table(s) 136 in the memory 124 of the storage computing system 102A and/or in another memory, a particular one of the indexes 138 may belong to the particular table, the database functionality 134 of the storage computing system 102B may store a first index partition 140 of the particular index in the memory 124 of the storage computing system 102B and/or in another memory, and the database functionality 134 of the storage computing system 102C may store a second index partition 142 of the particular index in the memory 124 of the storage computing system 102C and/or in another memory.

The index(es) 138 may include one or more primary indexes and/or one or more secondary indexes, such as a global secondary index ("GSI"). Each of the index(es) 138 may belong to one of the table(s) 136, which is referred to as a base table for that index. A primary index includes the primary key of the base table and may include additional fields but does not contain duplicates. On the other hand, a secondary index may contain duplicates. A GSI may have a partition key and a sort key that may be different from those of the base table. A GSI is considered "global" because queries on the GSI may span all of the data stored in the base table, across all of the partitions of the base table. A GSI may have no size limitation and may have its own provisioned throughput settings for read and write activity that are separate from those of the base table.

As mentioned above, the database 101 may include one or more data sets (e.g., the table(s) 136, the index(es) 138, and/or the like). One or more portions of a particular data set (or the entire data set) stored by a particular location (e.g., the memory 124 of the storage computer system 102A) may be replicated and stored in one or more other locations (e.g., one or more different ones of the storage computer system(s)

102) and/or in a different arrangement, subset, or format. For example, data may be projected from the particular data set into a projected data set that is stored in the same location(s) as the particular data set and/or one or more different locations from the particular data set. The projected data set may be specified according to a schema that differs from a schema of the particular data set. By way of a non-limiting example, the particular data set may be one of the table(s) 136 and the projected data set may be one of the index(es) 138 (e.g., a secondary index).

The conditional propagation functionality 132 may be implemented by one or more of the storage computing system(s) 102 as a service. The conditional propagation functionality 132 propagates any changes or updates to the particular data set (e.g., one of the table(s) 136) to any data sets that were projected from the particular data set. For example, the conditional propagation functionality 132 may propagate any changes or updates to a particular one of the table(s) 136 to any of the index(es) 138 associated with (e.g., belonging to) that particular table. The conditional propagation functionality 132 helps maintain consistency between the particular data set and replicated portions of the particular data set by propagating updates made to the particular data set to the replicated portions of the particular data set. Updates (e.g., received from one or more of the client computing system(s) 104) may include one or more different types of actions, modifications, or changes to the particular data set (e.g., insert new item(s), insert new attributes of one or more items, modify item(s), modify attribute(s) of one or more items, delete item(s), delete attribute(s) of one or more items, etc.). These updates may be performed on the data set in an order. As the number and size of replicated portions of the particular data set and the particular data set itself increase, the propagation of updates may negatively impact the ability of the storage computing system(s) 102 to provide access to the particular data set and/or propagate updates to replicated portions of the particular data set. For example, stateful propagation protocols (e.g., queue-based protocols) may consume large amounts of memory and network bandwidth to maintain propagation state to ensure consistent ordering of updates at the replicated portion of the particular data set. Separate sender sessions, queues, and/or other mapping or metadata may increase quadratically with respect to a number of partitions of a database table, for instance.

The conditional propagation functionality 132 may use conditional operations to reduce and/or eliminate the need to maintain large amounts of state information. Instead, the conditional propagation functionality 132 may perform condition checks (e.g., as part of a conditional operation) to enforce an ordering of updates to the replicated portions of the particular data set (e.g., to prevent an earlier value from overwriting a later value in the particular data set).

The processor(s) 122 may include one or more circuits that perform at least a portion of the instructions 130 stored in the memory 124. The processor(s) 122 may include one or more parallel processing units ("PPU(s)"), such as one or more graphics processing units ("GPU(s)"), one or more accelerators, and/or others. The processor(s) 122 may be implemented, for example, using a main central processing unit ("CPU") complex, one or more microprocessors, one or more microcontrollers, PPU(s) (e.g., accelerator(s), GPU(s), and/or others), one or more data processing units ("DPU(s)"), one or more arithmetic logic units ("ALU(s)"), and/or others. The memory 124 (e.g., one or more non-transitory processor-readable medium) may be implemented, for example, using volatile memory (e.g., dynamic random-access memory ("DRAM")) and/or nonvolatile memory (e.g., a hard drive, a solid-state device ("SSD"), and/or others). The user interface 126 may include a display device (not shown) that a user may use to view information generated and/or displayed by one of the storage computing system(s) 102 of which the display device is a part. In at least one embodiment, the user may use the user interface 126 to enter user input into one of the storage computing system(s) 102 of which the user interface 126 is a part. In at least one embodiment, referring to FIG. 1, the user interface 126 may communicate (e.g., wirelessly) with a user device (e.g., a cellular telephone, a laptop computer, a tablet, and/or others) and may receive user input from the user device. In at least one embodiment, the memory 124, the processor(s) 122, and/or the user interface 126 may communicate with one another over connection(s) 128, such as a bus, a Peripheral Component Interconnect Express ("PCIe") connection (or bus), and/or others.

Each of the client computing system(s) 104 may be implemented using one or more computing devices, such as a system 900 (see FIG. 9). Each of the client computing system(s) 104 includes one or more processors 152 like the processor(s) 122, memory 154 like the memory 124, and a user interface 156 like the user interface 126. In at least one embodiment, the processor(s) 152, the memory 154, and/or the user interface 156 may communicate with one another over connection(s) 158 like the connection(s) 128. The memory 154 (e.g., one or more non-transitory processor-readable medium) stores machine executable instructions 160 that when performed by processor(s) 152 implement update functionality 162.

The update functionality 162 implemented by one of the client computing system(s) 104 may communicate over the network(s) 106 with the database functionality 134 implemented by one or more of the storage computing system(s) 102. In at least some embodiments, a user may use the user interface 156 of one of the client computing system(s) 104 to enter update information into the update functionality 162. By way of another non-limiting example, one or more of the client computing system(s) 104 may perform an application and/or a service that may automatically provide update information to the update functionality 162. The update functionality 162 may communicate the update information to a particular data set (e.g., a particular one of the table(s) 136) via the database functionality 134 implemented by one or more of the storage computing system(s) 102. The database functionality 134 may notify the conditional propagation functionality 132 of the update and the conditional propagation functionality 132 may propagate any changes to the particular data set (e.g., the particular table) to any replicated portions of the particular data set (e.g., one or more of the index partitions 140 and 142) affected by the update. By way of yet another non-limiting example, one or more of the storage computing system(s) 102 may perform an application and/or a service that may provide update information to the database functionality 134, which may notify the conditional propagation functionality 132 of the update. Then, the conditional propagation functionality 132 may propagate any changes to the particular data set (e.g., the particular table) to any replicated portions of the particular data set (e.g., one or more of the index partitions 140 and 142) affected by the update.

Figure 2:
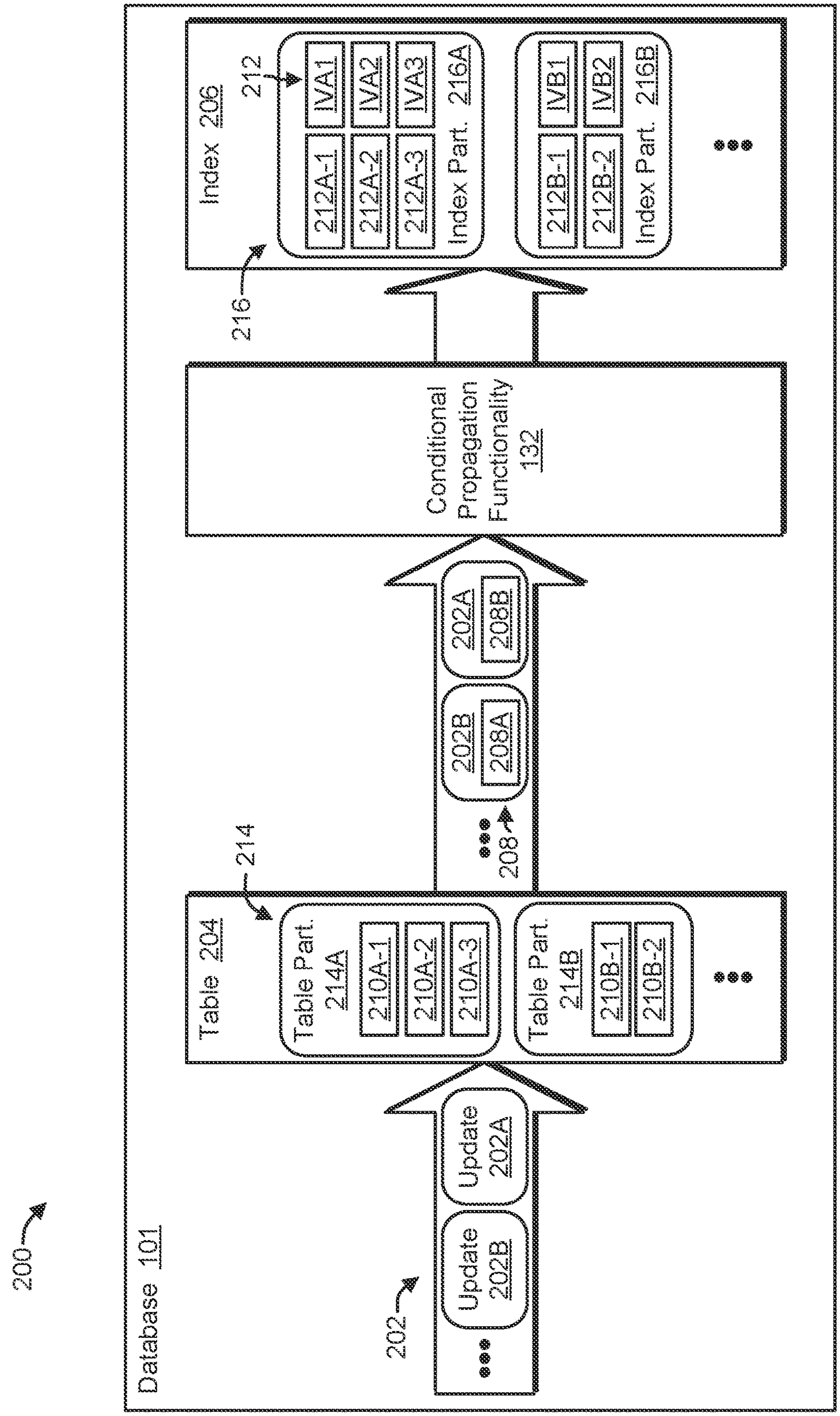
FIG. 2 illustrates a block diagram illustrating a method of propagating one or more updates made to a database table to a database index (e.g., a secondary index, a GSI, and/or the like), in accordance with an embodiment.

FIG. 2 illustrates a block diagram illustrating a method 200 of propagating one or more updates 202 made to a table 204 to an index 206 (e.g., a secondary index, a GSI, and/or the like), in accordance with an embodiment. The method 200 may be performed by the system 100 (see FIG. 1). The table 204 may be one of the table(s) 136 (see FIG. 1) and the index 206 may be one of the index(es) 138 (see FIG. 1). The update(s) 202 may have been made by the update functionality 162 performed by one of the client computing system(s) 104 (see FIG. 1) and/or automatically by one or more of the storage computing system(s) 102. Any update made to the table 204 may need to be propagated to at least one index (e.g., the index 206).

The conditional propagation functionality 132 may order any of the update(s) 202 propagated to the index 206 using one or more conditional operations. For example, the conditional propagation functionality 132 may enforce update ordering according to one or more version comparisons. The conditional propagation functionality 132 may, in at least some embodiments, perform at least one comparison along with another operation (e.g., insert, update, and/or delete).

For example, for each of the update(s) 202, the database 101 (e.g., the database functionality 134 implemented by one of the storage computing system(s) 102 illustrated in FIG. 1) may assign an update version 208, such as a timestamp, a sequence number, or other value to each of the update(s) 202 when the update is received, when the database 101 determines the update is to be propagated (e.g., a timestamp assigned when the update is propagated), or the database 101 may use some other assignment technique (e.g., as part of an ordering for performing the update(s) 202 to the table 204). For example, the database 101 may assign update versions 208A and 208B to updates 202A and 202B, respectively. In this example, update version 208B may be newer than update version 208A because the update 202B was received after the update 202A.

The data set(s) (e.g., the table 204, the index 206, and/or the like) each store one or more items (e.g., database records), which may be distributed in two or more partitions of the data set. At least one of these item(s) may be updated by each of the update(s) 202. For example, the table 204 includes the table partitions 214A and 214B. In the example illustrated in FIG. 2, the table partition 214A includes items 210A-1, 210A-2, and 210A-3, and the table partition 214B includes items 210B-1 and 210B-2. In the example illustrated in FIG. 2, the update 202A will be described as updating the item 210A-3 in the table partition 214A. Also, in this example, the index 206 includes index partitions 216A and 216B, the index partition 216A includes items 212A-1, 212A-2, and 212A-3, and the index partition 216B includes items 212B-1 and 212B-2. For ease of illustration, the item 212A-3 of the index partition 216A will be described as being a projection of the item 210A-3 in the table partition 214A. Thus, when the database 101 applies the update 202A to the item 210A-3 in the table partition 214A, the update 202A also needs to be applied to the item 212A-3 of the index partition 216A.

The items stored within projected data may each be associated with an item version 212 (e.g., a tombstone) that stores the update version associated with the update that was most recently applied to the item. For example, in FIG. 2, the items 212A-1, 212A-2, and 212A-3 of the index partition 216A are associated with item versions IVA1, IVA2, and IVA3, respectively, and the items 212B-1 and 212B-2 of the index partition 216B are associated with item versions IVB1 and IVA2, respectively.

The conditional propagation functionality 132 may order any of the update(s) 202 received for a particular item stored in the index 206 and/or one of index partitions 216 that has not yet applied in accordance with their update versions 208. By way of a non-limiting example, the conditional propagation functionality 132 may process the update(s) 202 in accordance with their update versions 208. For example, the conditional propagation functionality 132 may process older updates first. In such embodiments, the conditional propagation functionality 132 may select an oldest of the update(s) 202 first.

The conditional propagation functionality 132 may use the update version of the selected update to perform at least one comparison and as a result of the comparison either apply or not apply the update to a particular item. Whenever the conditional propagation functionality 132 receives an update for a particular item stored in the index 206 (or a partition thereof), the conditional propagation functionality 132 compares the update version assigned to the update to the item version associated with the particular item. If the conditional propagation functionality 132 determines the update version assigned to the update indicates the update is older than the item version associated with the particular item, the conditional propagation functionality 132 may simply discard the update. On the other hand, if the conditional propagation functionality 132 determines the update version assigned to the update indicates the update is newer than the item version associated with the particular item, the conditional propagation functionality 132 may apply the update to the index 206 (or one or more partition thereof). The comparison(s) may be characterized as being condition that must be satisfied to perform the update, which may be characterized as being an operation. Such a condition check may prevent out-of-order updates from overwriting or otherwise becoming visible to client applications that access the index 206.

For example, when the database 101 applies the update 202A to the item 210A-3 in the table partition 214A, the update 202A also needs to be applied to the item 212A-3 of the index partition 216A. When the conditional propagation functionality 132 processes the update 202A, the conditional propagation functionality 132 compares the update version 208A to the item version IVA3 associated with the item 212A-3 of the index partition 216A. If the update version 208A is newer than the item version IVA3, the conditional propagation functionality 132 applies the update 202A to the item 212A-3. Otherwise, the conditional propagation functionality 132 may discard or ignore the update 202A (and clear the update 202A from communication buffers discussed below).

The database 101 may store the item version(s) 212 as system attributes or values. The item version(s) 212 may not be visible to client applications that access the index 206 (e.g., using a query). The database 101 may include support for some or all of the following operations on data maintained in a data set (such as the table 204, the index 206, and/or the like) by a service on behalf of a storage service client (e.g., one of the storage computing system(s) 102, one of the client computing system(s) 104, and/or the like): create a secondary index, perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database 101 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Figure 3:
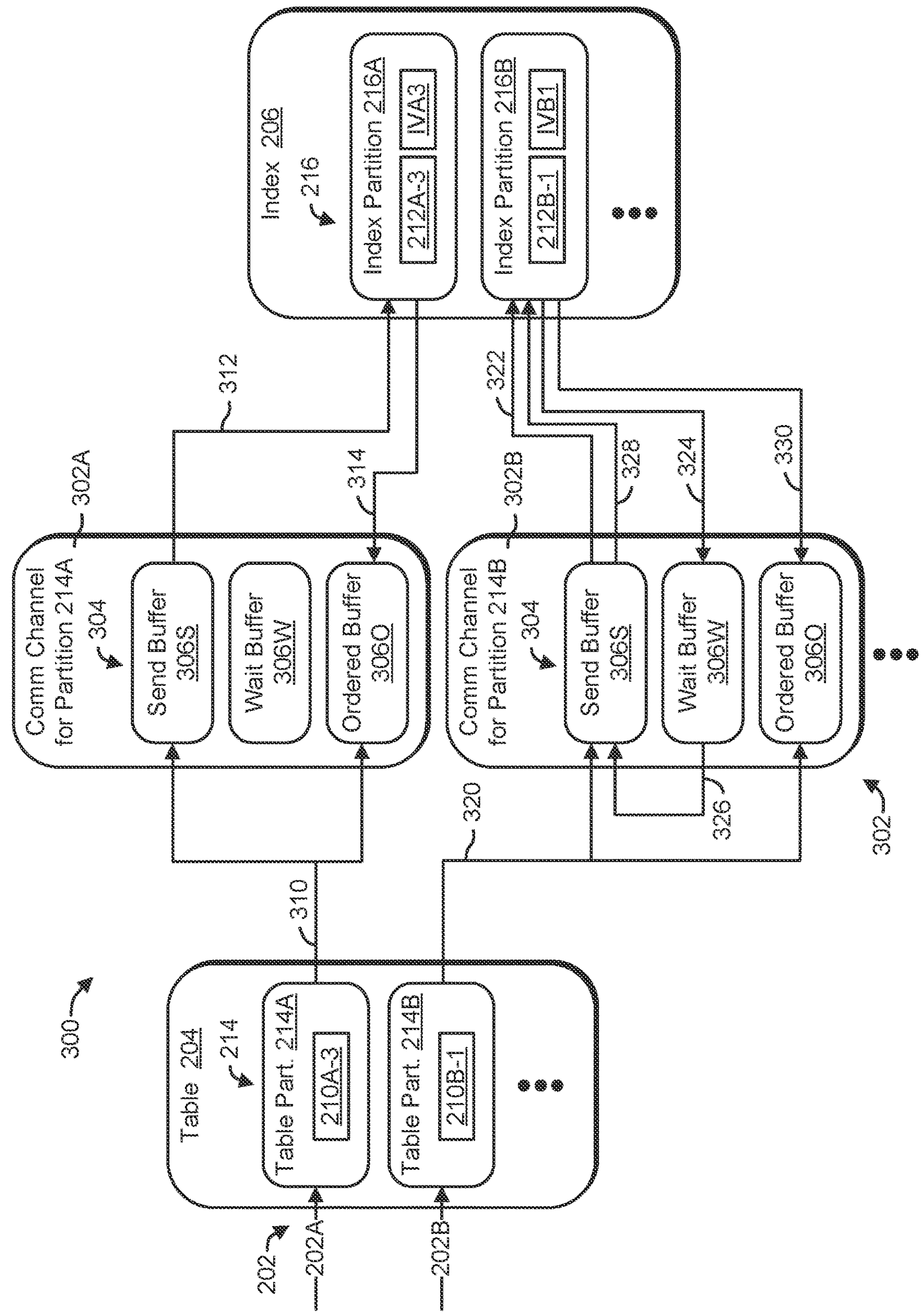
FIG. 3 illustrates a block diagram illustrating a method of propagating of update(s) from a database table to a database index, in accordance with an embodiment.

FIG. 3 illustrates a block diagram illustrating a method 300 of propagating of the update(s) 202 (see FIG. 2) from the table 204 to the index 206 (e.g., a secondary index, a GSI, and/or the like), in accordance with an embodiment. The method 300 may be performed by the conditional propagation functionality 132 (see FIGS. 1 and 2). The update(s) 202 may have been made by one of the client computing system(s) 104 (see FIG. 1). As mentioned herein, the conditional propagation functionality 132 may implement conditional operations (e.g., updates) to the index 206, which will enforce an ordering of the update(s) 202. The database 101 may implement a horizontally scalable secondary index architecture and the conditional propagation functionality 132 may use conditional puts for ordering the update(s) 202 and maintaining data correctness to reduce and/or eliminate the need to maintain complex states for communication between the table 204 (or a partition of the table 204) and the index 206 (or a partition of the index 206).

The conditional propagation functionality 132 may establish and/or maintain a communication channel 302 between each of the table partitions 214 of the table 204 and the index 206 (or one or more index partitions 216 of the index 206). The communication channel(s) 302 may reduce a rate of increase in memory overhead from quadratic to linear. The conditional propagation functionality 132 may generate and maintain a communication channel for each unique pair of the table partition(s) 214 and each unique index (e.g., the index 206). For example, in FIG. 3, the conditional propagation functionality 132 may generate a first communication channel 302A for a first pair including the table partition 214A and the index 206, and a second communication channel 302B for a second pair including the table partition 214B and the index 206. Each of the communication channels 302 includes a set 304 of buffers that includes a send buffer 306S, a wait buffer 306W, and an ordered buffer 3060. The communication channel(s) 302 may omit a receiving buffer located at the index 206. Instead of maintaining a separate state per index partition, each of the communication channel(s) 302 may maintain a single state per index. Any updates stored in the ordered buffer 3060 may be ordered by their update versions.

The send buffer 306S stores any of the update(s) 202 that are ready to be sent to the index 206 (e.g., to one or more of the index partition(s) 216). The wait buffer 306W stores any of the update(s) 202 that were rejected by the index 206 to allow the rejected update(s) to be resent in the future. When resending is to be attempted may be calculated based at least in part on criteria, such as exponential backoff and/or the like. By storing such rejected update(s) in the wait buffer 306W, the conditional propagation functionality 132 is able to communicate an update to the index 206 at a time when the index 206 (e.g., an index partition to be updated), which was experiencing an outage during a previous attempt, is no longer experiencing the outage. The wait buffer 306W may help save processor (e.g., CPU) cycles that would have been used repeatedly attempting to apply updates to the index 206 at a time during which the updates cannot be applied. The ordered buffer 3060 stores any of the update(s) 202 (e.g., ordered by their update versions 208) received from one of the table partition(s) 214 that has not yet been cleared by the conditional propagation functionality 132. This helps ensure that updates are not lost when they are moved from the send buffer 306S to the wait buffer 306W and vice versa, which helps ensure data correctness.

For example, in FIG. 3, the database 101 receives the update 202A for the table partition 214A and applies the update 202A to the table partition 214A. The database 101 assigns the update version 208A (see FIG. 2) to the update 202A and sends the update 202A to the conditional propagation functionality 132. The communication protocol used to communicate between the table partition(s) 214 and the index 206 identifies the index partition that is to be updated. Therefore, the conditional propagation functionality 132 is able to route the update 202A to the correct index partitions 216A. In the embodiment illustrated, the database 101 may maintain state information for the table partition(s) 214 but may not maintain state information for the index partition(s) 216.

The conditional propagation functionality 132 receives and stores (represented by a forked arrow 310) the update 202A in the send buffer 306S and the ordered buffer 3060 of the communication channel 302A. The conditional propagation functionality 132 may order (or sort) any updates stored in any of the buffers 306S, 306W, and 3060 of the communication channel 302A in accordance with their update versions 208 (see FIG. 2). The conditional propagation functionality 132 performs a conditional check on each update stored in the send buffer 306S of the communication channel 302A. For the update 202A, the conditional propagation functionality 132 determines to which item in the index 206 the update 202A is to be applied and where that item is stored (e.g., which may be specified by the communication protocol). In this example, the update 202A is to be applied to the item 212A-3, which is stored in the index partition 216A. Then, the conditional propagation functionality 132 compares the update version 208A of the update 202A to the item version IVA3 of the item 212A-3. The conditional propagation functionality 132 removes the update 202A from the send buffer 306S (and the ordered buffer 3060) and discards the update 202A if the conditional propagation functionality 132 determines the update version 208A indicates the update 202A is older than the item version IVA3. On the other hand, as shown in FIG. 3, the conditional propagation functionality 132 removes (represented by an arrow 312) the update 202A from the send buffer 306S and attempts to apply the update 202A to the item 212A-3 if the conditional propagation functionality 132 determines the update version 208A indicates the update 202A is newer than the item version IVA3. Because in FIG. 3 this attempt is successful, the conditional propagation functionality 132 removes (represented by an arrow 314) the update 202A from the ordered buffer 3060.

FIG. 3 also illustrates an example of what may happen when an attempt is unsuccessful. For example, the database 101 receives the update 202B for the table partition 214B and applies the update 202B to the table partition 214B. The database 101 assigns the update version 208B (see FIG. 2) to the update 202B and sends the update 202B to the conditional propagation functionality 132.

The conditional propagation functionality 132 receives and stores (represented by a forked arrow 320) the update 202B in the send buffer 306S and the ordered buffer 3060 of the communication channel 302B. In this example, the update 202B is to be applied to the item 212B-1, which is stored in the index partition 216B. After the conditional propagation functionality 132 determines the update version 208B is newer than the item version IVB1 of the item 212B-1, the conditional propagation functionality 132 removes (represented by an arrow 322) the update 202B from the send buffer 306S and attempts to apply the update 202B to the item 212B-1. Because in FIG. 3 this attempt is unsuccessful, the conditional propagation functionality 132 stores (represented by an arrow 324) the update 202B in the wait buffer 306W of the communication channel 302B. After an amount of time has elapsed (e.g., a predetermined and/or calculated amount of time), the conditional propagation functionality 132 removes (represented by an arrow 326) the update 202B from the wait buffer 306W and stores the update 202B in the send buffer 306S of the communication channel 302B. After conditional propagation functionality 132 selects the update 202B for processing again, the conditional propagation functionality 132 removes (represented by an arrow 328) the update 202B from the send buffer 306S and attempts to apply the update 202B to the item 212B-1. When, as shown in FIG. 3, the conditional propagation functionality 132 is successful at applying the update 202B, the conditional propagation functionality 132 removes (represented by an arrow 330) the update 202B from the ordered buffer 3060. Whenever the conditional propagation functionality 132 is unsuccessful at applying the update 202B, the conditional propagation functionality 132 may return the update 202B to the wait buffer 306W.

If for some reason, an update remains in the ordered buffer 3060 for more than a timeout amount of time, the conditional propagation functionality 132 may remove the update from the ordered buffer 3060 (and any other buffers also storing the update) and perform one or more corrective actions and/or cause the corrective action(s) to be performed. The conditional propagation functionality 132 may start a counter when an update is stored in the ordered buffer 3060. If the counter reaches the timeout amount of time before the update is removed from the ordered buffer 3060, the conditional propagation functionality 132 may remove the update from the ordered buffer 3060 (and any other buffers also storing the update) and perform the corrective action(s). By way of a non-limiting example, the corrective action(s) may include resending the update to the send buffer 306S, and/or causing the update to be resent to the send buffer 306S so that the conditional propagation functionality 132 may retry applying the update to the index 206. By way of another non-limiting example, the corrective action(s) may include the conditional propagation functionality 132 resetting the communication channel between the table 204 and the index 206, and/or causing the communication channel to be reset (e.g., by the database 101). By way of yet another non-limiting example, the corrective action(s) may include the conditional propagation functionality 132 notifying an operator (e.g., an engineer) to perform a manual intervention, and/or causing the operator to be notified. An example of such a manual intervention includes transiently scaling the index 206 (e.g., increasing throughput capacity to drain the pending update). In at least one embodiment, the corrective action(s) may include performing another type of corrective action, and/or causing another type of corrective action to be performed.

Figure 4:
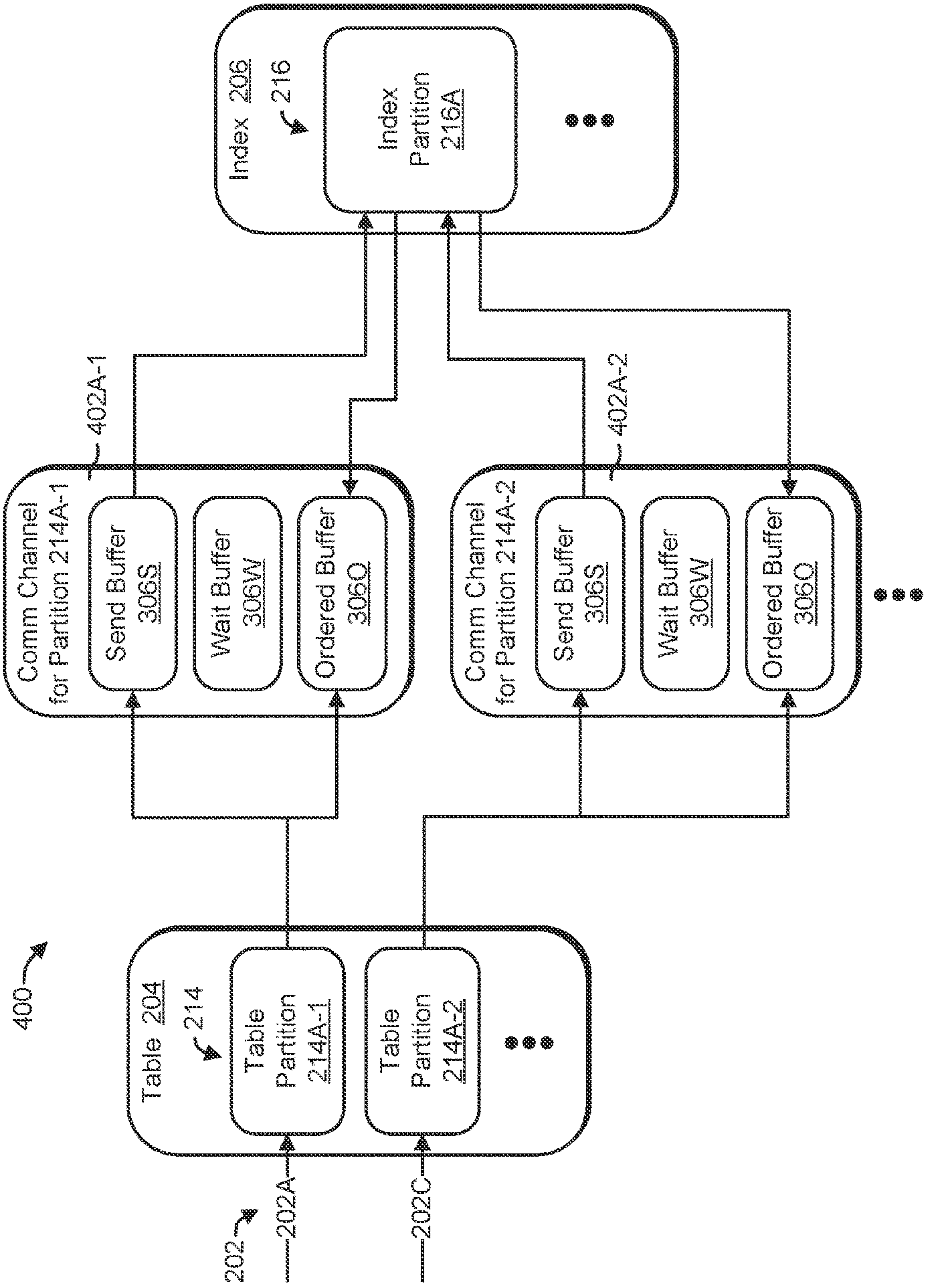
FIG. 4 illustrates a block diagram illustrating a table partition split, in accordance with an embodiment.

FIG. 4 illustrates a block diagram 400 illustrating a table partition split, in accordance with an embodiment. If the database 101 splits a particular one of the table partition(s) 214 into two or more new table partitions, the conditional propagation functionality 132 may create, for each of the new table partitions, a copy of the communication channel for the particular table partition. For example, in FIG. 4, the table partition 214A (see FIGS. 2 and 3) has been split into table partitions 214A-1 and 214A-2. In response, the conditional propagation functionality 132 has created communication channels 402A-1 and 402A-2 for the table partitions 214A-1 and 214A-2, respectively. The communication channels 402A-1 and 402A-2 are copies of the communication channel 302A (see FIG. 3). In this manner, states associated with the particular table partition (e.g., the table partition 214A) are also associated with the new table partitions (e.g., the table partitions 214A-1 and 214A-2). Further, any states associated with the communication channel 302A are also associated with the communication channels 402A-1 and 402A-2. If duplicating the communication channel 302A causes a duplicate update to be stored in the send buffers 306S of the communication channels 402A-1 and 402A-2, the condition checks performed by the conditional propagation functionality 132 on the index 206 (e.g., the index partition(s) 216) will cause the conditional propagation functionality 132 to ignore or disregard any already processed updates, which helps ensure correctness. In the example illustrated in FIG. 4, the update 202A to the table partition 214A-1 is applied to the index partition 216A and the update 202C to the table partition 214A-2 is also applied to the index partition 216A. But the updates 202A and 202C may be applied to different items stored by the index partition 216A.

Figure 5:
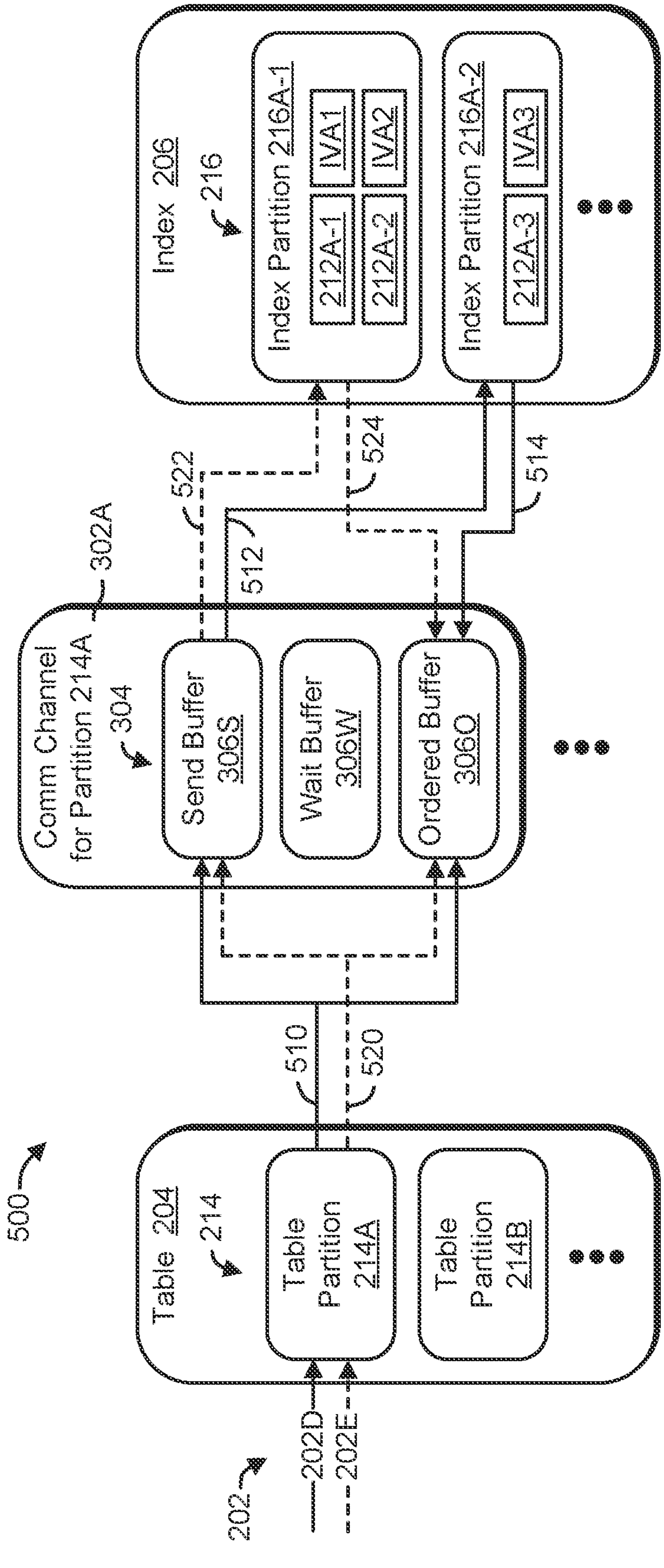
FIG. 5 illustrates a block diagram illustrating an index partition split, in accordance with an embodiment.

FIG. 5 illustrates a block diagram 500 illustrating an index partition split, in accordance with an embodiment. If the database 101 splits a particular one of the index partition(s) 216 into two or more new index partitions, the conditional propagation functionality 132 need not generate new communication channels or state information. For example, in FIG. 5, the index partition 216A (see FIGS. 2 and 3) has been split into index partitions 216A-1 and 216A-2. The communication protocol used to communicate between the table partition(s) 214 and the index 206 identifies the index partition that is to be updated. Therefore, the conditional propagation functionality 132 is able to route updates 202D and 202E to the correct index partitions 216A-2 and 216A-1, respectively. In the embodiment illustrated, the database 101 does not maintain state per index partition. The conditional propagation functionality 132 may route any updates for new index partitions thereto.

For example, in FIG. 5, the database 101 receives the updates 202D and 202E for the table partition 214A and applies the updates 202D and 202E to the table partition 214A. The database 101 assigns update versions to the updates 202C and 202E and forwards them to the conditional propagation functionality 132. The conditional propagation functionality 132 receives and stores (represented by forked solid arrow 510 and forked dashed arrow 520, respectively) the updates 202D and 202E in the send buffer 306S and the ordered buffer 3060 of the communication channel 302A.

Next, the conditional propagation functionality 132 may select the oldest of the updates stored in the send buffer 306S, which in this example is the update 202D. In this example, the update 202D is to be applied to the item 212A-3, which is stored in the index partition 216A-2. The conditional propagation functionality 132 compares the update version of the update 202D to the item version IVA3 of the item 212A-3 stored in the index partition 216A-2. The conditional propagation functionality 132 removes the update 202D from the send buffer 306S (and the ordered buffer 3060) and discards the update 202D if the conditional propagation functionality 132 determines the update version indicates the update 202D is older than the item version IVA3. On the other hand, as shown in FIG. 5, the conditional propagation functionality 132 removes (represented by an arrow 512) the update 202D from the send buffer 306S and attempts to apply the update 202D to the item 212A-3 if the conditional propagation functionality 132 determines the update version indicates the update 202D is newer than the item version IVA3. Because in FIG. 5 this attempt is successful, the conditional propagation functionality 132 removes (represented by an arrow 514) the update 202D from the ordered buffer 3060.

Next, the conditional propagation functionality 132 may select the oldest of the updates stored in the send buffer 306S, which in this example is now the update 202E. In this example, the update 202E is to be applied to the item 212A-1, which is stored in the index partition 216A-1. Then, the conditional propagation functionality 132 compares the update version of the update 202E to the item version IVA1 of the item 212A-1 stored in the index partition 216A-1. The conditional propagation functionality 132 removes the update 202E from the send buffer 306S (and the ordered buffer 3060) and discards the update 202E if the conditional propagation functionality 132 determines the update version indicates the update 202E is older than the item version IVA1. On the other hand, as shown in FIG. 5, the conditional propagation functionality 132 removes (represented by an arrow 522) the update 202E from the send buffer 306S and attempts to apply the update 202E to the item 212A-1 if the conditional propagation functionality 132 determines the update version indicates the update 202E is newer than the item version IVA1. Because in FIG. 5 this attempt is successful, the conditional propagation functionality 132 removes (represented by an arrow 524) the update 202E from the ordered buffer 3060.

Figure 6:
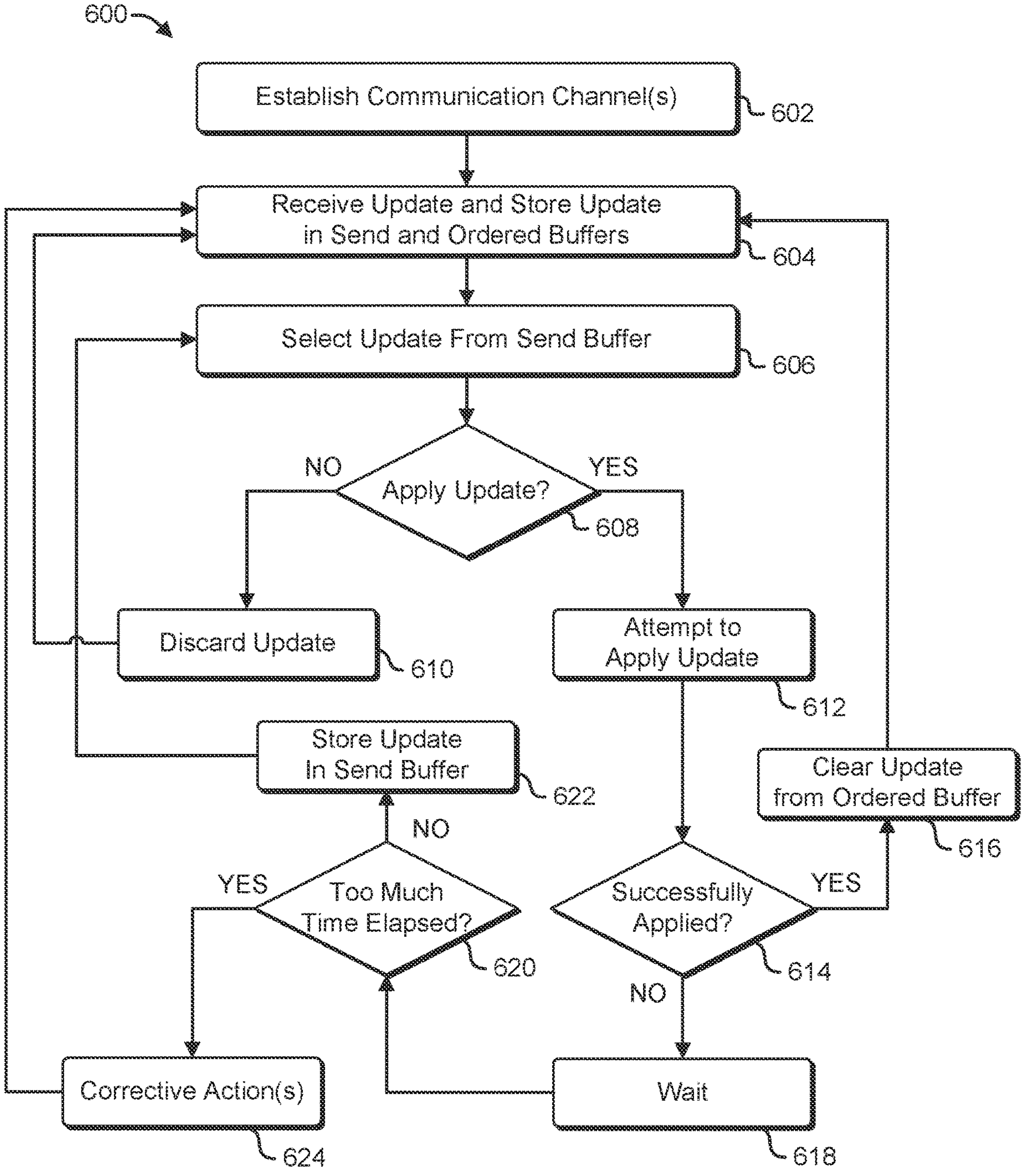
FIG. 6 illustrates a flow diagram of a first method that may be performed by the system of FIG. 1, in accordance with an embodiment.

FIG. 6 illustrates a flow diagram of a first method 600 that may be performed by the system 100 (see FIG. 1), in accordance with an embodiment. The method 600 may be performed by the database 101 (see FIGS. 1 and 2) and/or the conditional propagation functionality 132 (see FIGS. 1 and 2).

At first block 602, the conditional propagation functionality 132 establishes a communication channel (e.g., the communication channel(s) 302 illustrated in FIG. 3) between each table partition (e.g., the table partition(s) 214) of a particular table (e.g., the table 204) and a particular index (e.g., the index 206) associated with the particular table. Each of the communication channels includes a set of buffers that includes a send buffer, a wait buffer, and an ordered buffer (e.g., the send buffer 306S, the wait buffer 306W, and the ordered buffer 3060). However, at least one embodiment, may omit at least one of the buffers (e.g., the wait buffer).

Then, at block 604, the conditional propagation functionality 132 receives an update and stores the update in the send buffer and the ordered buffer of the communication channel associated with the table partition that was updated by the update. The conditional propagation functionality 132 may also start a counter and/or cause the counter to be started. The counter may be used to determine when the update has been stored too long in the wait buffer and/or the ordered buffer.

Next, at block 606, the conditional propagation functionality 132 selects the update from the send buffer (e.g., when the update is the oldest update stored in the send buffer). The conditional propagation functionality 132 identifies the item in the particular index to which the update is to be applied and where the identified item is stored in the system 100 (e.g., in which index partition).

At decision block 608, the conditional propagation functionality 132 determines whether to apply the update to the identified item. The conditional propagation functionality 132 may decide whether to apply the update to the identified item based at least in part on one or more condition check. For example, the conditional propagation functionality 132 may compare an update version assigned to the selected update by the database 101 to the item version of the identified item. The item version may correspond to an update version of the last update that was applied to the identified item. If the update version is newer than the item version, the conditional propagation functionality 132 decides to apply the update to the identified item and the decision at decision block 608 is "YES." Otherwise, the decision at decision block 608 is "NO."

When the decision at decision block 608 is "NO," at block 610, the conditional propagation functionality 132 may discard or ignore the selected update. For example, the conditional propagation functionality 132 may discard the identified update and remove or clear the selected update from the ordered buffer. Then, the conditional propagation functionality 132 may return to block 604 to receive another update.

When the decision at decision block 610 is "YES," at block 612, the conditional propagation functionality 132 attempts to apply the update to the identified item.

If the conditional propagation functionality 132 is able to successfully apply the update to the identified item, a decision in decision block 614 is "YES." Otherwise, the decision at decision block 614 is "NO."

When the decision at decision block 614 is "YES," at block 616, the conditional propagation functionality 132 removes the update from the ordered buffer. The conditional propagation functionality 132 may also stop the counter started for the update in block 604. Then, the method 600 may terminate with respect to the update. At this point, the conditional propagation functionality 132 may return to block 604 to receive another update and may perform the method 600 with respect to the other update.

When the decision at decision block 614 is "NO," at block 618, the conditional propagation functionality 132 waits an amount of time before reattempting to apply the update to the identified item. In embodiments that include the wait buffer, the conditional propagation functionality 132 stores the update in the wait buffer.

At decision block 620, the conditional propagation functionality 132 determines whether the counter started for the update in block 604 indicates too much time has elapsed since the update was received. For example, the conditional propagation functionality 132 may compare a value of the counter to a threshold value, and determine whether too much time has elapsed since the update was received based on that comparison. The decision in decision block 620 is "YES" when the conditional propagation functionality 132 determines too much time has elapsed since the update was received. Otherwise, the decision at decision block 620 is "NO."

When the decision at decision block 620 is "NO," at block 622, the conditional propagation functionality 132 stores the update in the send buffer. Then, the conditional propagation functionality 132 returns to block 606 and selects the update from the send buffer (e.g., when the update is the oldest update stored in the send buffer). On the other hand, when the decision at decision block 620 is "YES," the conditional propagation functionality 132 advances to block 624 and takes one or more corrective actions. By way of a non-limiting example, the corrective action(s) may include resending the update to the send buffer, and/or causing the update to be resent to the send buffer (e.g., by the database 101) so that the conditional propagation functionality 132 may retry applying the update to the particular index. By way of another non-limiting example, the corrective action(s) may include the conditional propagation functionality 132 resetting the communication channel between the particular table and the particular index, and/or causing the communication channel to be reset (e.g., by the database 101). By way of yet another non-limiting example, the corrective action(s) may include the conditional propagation functionality 132 notifying an operator (e.g., an engineer) to perform a manual intervention, and/or causing the operator to be notified. An example of such a manual intervention includes transiently scaling the particular index (e.g., increasing throughput capacity to drain the pending update). In at least one embodiment, the corrective action(s) may include performing another type of corrective action, and/or causing another type of corrective action to be performed.

Then, the method 600 may terminate with respect to the update. At this point, the conditional propagation functionality 132 may return to block 604 to receive another update and may perform the method 600 with respect to the other update.

Figure 7:
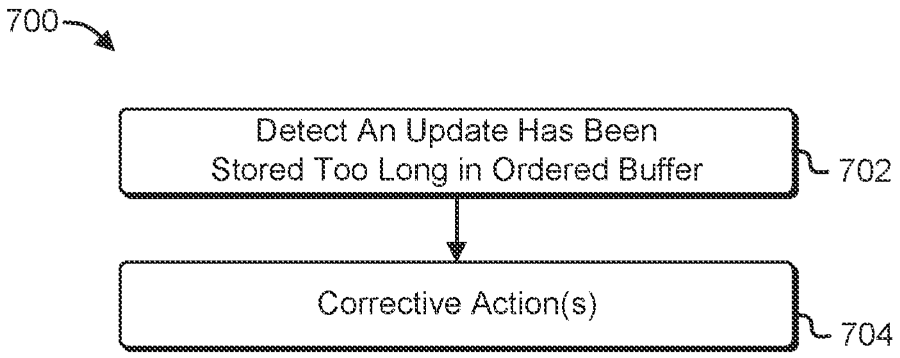
FIG. 7 illustrates a flow diagram of a second method that may be performed by the system of FIG. 1, in accordance with an embodiment.

FIG. 7 illustrates a flow diagram of a second method 700 that may be performed by the system 100 (see FIG. 1), in accordance with an embodiment. The method 700 may be performed by the database 101 (see FIGS. 1 and 2) and/or the conditional propagation functionality 132 (see FIGS. 1 and 2). The method 700 may be performed concurrently with the method 600 (see FIG. 6). Referring to FIG. 7, in first block 702, the conditional propagation functionality 132 determines an update has been stored too long in the wait buffer and/or the ordered buffer. As mentioned above, the conditional propagation functionality 132 may start a counter and/or cause the counter to be started in block 604 (see FIG. 6) of the method 600. The conditional propagation functionality 132 may use the counter to determine when the update has been stored too long in the wait buffer and/or the ordered buffer. For example, the counter may count down from a predetermined or calculated value and when the counter reaches zero, the conditional propagation functionality 132 may determine that the update has been stored too long in the wait buffer and/or the ordered buffer. By way of another non-limiting example, the conditional propagation functionality 132 may compare a value of the counter to a threshold value, and determine the update has been stored too long in the wait buffer and/or the ordered buffer based on that comparison. Next, in block 704, the conditional propagation functionality 132 takes one or more corrective actions, such as any of the correction actions described with respect to block 624 (see FIG. 6). The method 700 may terminate after block 704.

Figure 8:
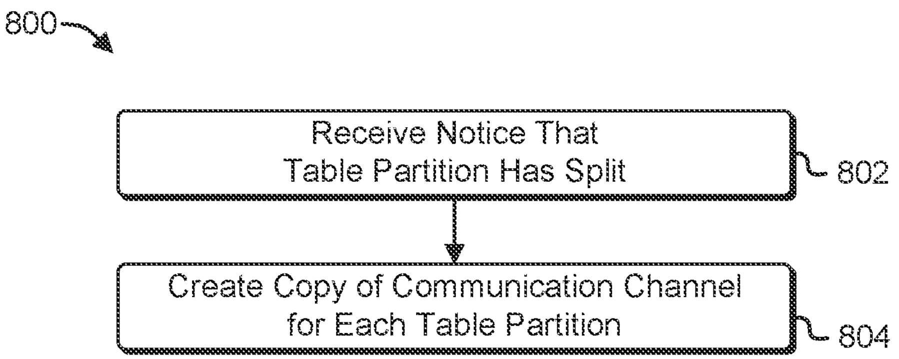
FIG. 8 illustrates a flow diagram of a third method that may be performed by the system of FIG. 1, in accordance with an embodiment.

FIG. 8 illustrates a flow diagram of a third method 800 that may be performed by the system 100 (see FIG. 1), in accordance with an embodiment. The method 800 may be performed by the database 101 (see FIGS. 1 and 2) and/or the conditional propagation functionality 132 (see FIGS. 1 and 2). The method 800 may be performed concurrently with the method 600 (see FIG. 6) and/or the method 700 (see FIG. 7). In first block 802, the conditional propagation functionality 132 receives a notification (e.g., from the database 101) that a particular table partition has split into two or more new table partitions. Then, in block 804, the conditional propagation functionality 132 creates, for each of the new table partitions, a copy of a particular communication channel established (e.g., in block 602 of FIG. 6) between the particular table partition and a particular index (e.g., a secondary index). The conditional propagation functionality 132 uses the new communication channels to propagate updates from the new table partitions to the particular index.

As one skilled in the art will appreciate in light of this disclosure, certain embodiments may be capable of achieving certain advantages, including some or all of the following: (1) implementing a horizontally scalable index that reduces a number of states that must be maintained and/or computing resources needed to maintain such states, and/or (2) propagating changes made to a database table to a database index in a manner that uses fewer computing resources, prevents older updates from overwriting newer updates, and/or helps ensure data stored by the database index is correct.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

At least one embodiment of the disclosure can be described in view of the following clauses:

1. A computer-implemented method, comprising: storing an update applied to a database table in first and second storage locations associated with the database table, the update being associated with a version identifier and any updates associated with version identifiers stored in the second storage location to be ordered in accordance with the version identifiers; removing the update from the first storage location; attempting to apply the update to a database index associated with the database table if the database index was last updated before the update was applied to the database table; and removing the update from the second storage location after the update is applied to the database index.

2. The computer-implemented method of clause 1, further comprising: detecting another update was received but has not been applied to the database index within an amount of time; and causing one or more corrective actions to be performed with respect to the other update.

3. The computer-implemented method of clause 1 or 2, further comprising: storing the update in a third storage location if attempting to apply the update to the database index fails; and waiting an amount of time before repeating an attempt to apply the update to the database index.

4. The computer-implemented method of any one of clauses 1-3, further comprising: creating a copy of the first and second storage locations for a newly created partition of the database table.

5. A system, comprising: one or more processors; memory that stores computer-executable instructions that, if executed, by the one or more processors cause the system to propagate an update associated with a version identifier from a database table to at least one item of a database index by: storing the update in a buffer, any updates stored in the buffer to be associated with version identifiers and to be ordered in accordance with the version identifiers; attempting to apply the update to the at least one item if at least one condition is satisfied; and removing the update from the buffer if an attempt to apply the update was successful.

6. The system of clause 5, wherein the computer-executable instructions, if executed, by the one or more processors cause the system to: perform one or more corrective actions if at least an amount of time has elapsed, and the update has not been applied to the database index.

7. The system of clause 5 or 6, wherein the computer-executable instructions, if executed, by the one or more processors cause the system to: store the update in a storage location for an amount of time if the attempt to apply the update was unsuccessful; and repeat the attempt to apply the update to the at least one item.

8. The system of any one of clauses 5-7, wherein the update was applied to an existing partition of the database table, the database table is to split into a plurality of table partitions, and the computer-executable instructions, if executed, by the one or more processors cause the system to: generate a plurality of buffers for at least a portion of the plurality of table partitions, the plurality of buffers to be identical to the buffer.

9. The system of any one of clauses 5-8, wherein the at least one condition comprises the update being more recent than a last update applied to the at least one item.

10. The system of any one of clauses 5-9, wherein the at least one condition comprises a comparison of an update version associated with the update and an item version associated with the at least one item indicates the update is newer than a last update applied to the at least one item.

11. The system of any one of clauses 5-10, wherein the at least one item is stored in an index partition that is to be split into a plurality of new index partitions, and the computer-executable instructions, if executed, by the one or more processors cause the system to propagate a new update from the database table to one or more items stored in a particular index partition of the plurality of new index partitions by: storing the new update in the buffer; attempting to apply the new update to the one or more items stored in the particular index partition if one or more conditions are satisfied; and removing the new update from the buffer if an attempt to apply the new update was successful.

12. The system of any one of clauses 5-11, wherein the database index is a secondary index.

13. A non-transitory computer-readable storage medium storing thereon executable instructions that, as a result of being executed by one or more processors of a computer system, cause the computer system to at least: store a plurality of updates made to a table partition of a database table in a send buffer and an ordered buffer, the plurality of updates to be ordered by versions associated with the plurality of updates in the ordered buffer; remove the plurality of updates from the send buffer; attempt to apply the plurality of updates to at least one item of a database index; and remove any of the plurality of updates applied to the at least one item from the ordered buffer.

14. The non-transitory computer-readable storage medium of clause 13, wherein the instructions further comprise instructions that, as a result of being executed by the one or more processors, cause the computer system to: perform one or more corrective actions with regard to any of the plurality of updates remaining in the ordered buffer more than an amount of time.

15. The non-transitory computer-readable storage medium of clause 13 or 14, wherein the instructions further comprise instructions that, as a result of being executed by the one or more processors, cause the computer system to: store one or more unsuccessful updates in a storage location, the one or more unsuccessful updates comprising any of the plurality of updates for which attempting to apply an update to the at least one item was unsuccessful; and attempt to apply the one or more unsuccessful updates to the at least one item after the one or more unsuccessful updates have been stored in the storage location for at least a wait time.

16. The non-transitory computer-readable storage medium of any one of clauses 13-15, wherein the table partition is to be split into a plurality of table partitions, and the instructions further comprise instructions that, as a result of being executed by the one or more processors, cause the computer system to: generate a plurality of buffers for at least a portion of the plurality of table partitions, the plurality of buffers to be identical to the buffer.

17. The non-transitory computer-readable storage medium of any one of clauses 13-16, wherein the at least one item is stored in an index partition that is to be split into a plurality of new index partitions, and the instructions further comprise instructions that, as a result of being executed by the one or more processors, cause the computer system to: store a new update in the ordered buffer; attempt to apply the new update to one or more items stored in a particular index partition of the plurality of new index partitions if the at least one item was last updated before the new update was applied to the table partition; and removing the new update from the ordered buffer if the attempt to apply the new update was successful.

18. The non-transitory computer-readable storage medium of any one of clauses 13-17, wherein the instructions further comprise instructions that, as a result of being executed by the one or more processors, cause the computer system to: store a new update in the ordered buffer; attempt to apply the new update to one or more items if one or more conditions are satisfied; and removing the new update from the ordered buffer if the attempt to apply the new update was successful.

19. The non-transitory computer-readable storage medium of clause 18, wherein the one or more conditions comprise a most recent update to the at least one item being older than the new update.

20. The non-transitory computer-readable storage medium of any one of clauses 13-19, wherein the database index is a global secondary index.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PUP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:

storing an update applied to a database table in first and second storage locations associated with the database table, the update being stored in the first storage location for a period of time before being removed, and the update being associated with a version identifier and any updates associated with version identifiers stored in the second storage location are ordered in accordance with the version identifiers;

removing the update from the first storage location to apply the update to a database index associated with the database table;

after removing the update from the first storage location, applying the update to the database index when a portion of the database index that is associated with the update is associated with a first version that is older than a second version indicated by the version identifier associated with the update; and removing the update from the second storage location after the update is applied to the database index.

2. The computer-implemented method of claim 1, further comprising:

detecting that another update has been received but has not been applied to the database index within an amount of time; and causing one or more corrective actions to be performed with respect to the other update.

3. The computer-implemented method of claim 1, further comprising:

storing the update in a third storage location when applying the update to the database index fails; and waiting an amount of time before reapplying the update to the database index.

4. The computer-implemented method of claim 1, further comprising:

creating a copy of the first and second storage locations for a newly created partition of the database table.

5. A system, comprising:

one or more processors;

memory that stores computer-executable instructions that, when executed, by the one or more processors cause the system to propagate an update associated with a version identifier from a database table to at least one item of a database index by:

storing the update in two or more buffers, any updates stored in a first and second buffer of the two or more buffers are associated with version identifiers and are ordered in accordance with the version identifiers, the update is stored in the first buffer temporarily before being removed;

applying the update from the first buffer to the at least one item when at least one condition is satisfied; and removing the update from the second buffer when applying the update was successful.

6. The system of claim 5, wherein the computer-executable instructions, when executed, by the one or more processors cause the system to:

perform one or more corrective actions when at least an amount of time has elapsed, and the update has not been applied to the database index.

7. The system of claim 5, wherein the computer-executable instructions, when executed, by the one or more processors cause the system to:

store the update in a third buffer of the two or more buffers for an amount of time when applying the update was unsuccessful; and reapply the update to the at least one item.

8. The system of claim 5, wherein the update was applied to an existing partition of the database table, the database table being split into a plurality of table partitions, and the computer-executable instructions, when executed, by the one or more processors cause the system to:

generate a plurality of buffers for at least a portion of the plurality of table partitions, the plurality of buffers are identical to the buffer.

9. The system of claim 5, wherein the at least one condition comprises the update being more recent than a last update applied to the at least one item.

10. The system of claim 5, wherein the at least one condition comprises a comparison of an update version associated with the update and an item version associated with the at least one item indicates the update is newer than a last update applied to the at least one item.

11. The system of claim 5, wherein the at least one item is stored in an index partition that is split into a plurality of new index partitions, and the computer-executable instructions, when executed, by the one or more processors cause the system to propagate a new update from the database table to one or more items stored in a particular index partition of the plurality of new index partitions by:

storing the new update in the buffer;

applying the new update to the one or more items stored in the particular index partition when one or more conditions are satisfied; and removing the new update from the buffer when applying the new update was successful.

12. The system of claim 5, wherein the database index is a secondary index.

13. A non-transitory computer-readable storage medium storing thereon executable instructions that, as a result of being executed by one or more processors of a computer system, cause the computer system to at least:

store a plurality of updates made to a table partition of a database table in a send buffer and an ordered buffer, the plurality of updates are ordered by versions associated with the plurality of updates in the ordered buffer, the plurality of updates being stored in the send buffer for a period of time before being removed;

remove the plurality of updates from the send buffer;

apply the plurality of updates to at least one item of a database index, after the plurality of updates have been removed from the send buffer; and remove any of the plurality of updates applied to the at least one item from the ordered buffer.

14. The non-transitory computer-readable storage medium of claim 13, wherein the instructions further comprise instructions that, as a result of being executed by the one or more processors, cause the computer system to:

perform one or more corrective actions with regard to any of the plurality of updates remaining in the ordered buffer for more than an amount of time.

15. The non-transitory computer-readable storage medium of claim 13, wherein the instructions further comprise instructions that, as a result of being executed by the one or more processors, cause the computer system to:

store one or more unsuccessful updates in a storage location, the one or more unsuccessful updates comprising any of the plurality of updates for which applying an update to the at least one item was unsuccessful; and reapply the one or more unsuccessful updates to the at least one item after the one or more unsuccessful updates have been stored in the storage location for at least a wait time.

16. The non-transitory computer-readable storage medium of claim 13, wherein the table partition is split into a plurality of table partitions, and the instructions further comprise instructions that, as a result of being executed by the one or more processors, cause the computer system to:

generate a plurality of buffers for at least a portion of the plurality of table partitions, the plurality of buffers are identical to the buffer.

17. The non-transitory computer-readable storage medium of claim 13, wherein the at least one item is stored in an index partition that is split into a plurality of new index partitions, and the instructions further comprise instructions that, as a result of being executed by the one or more processors, cause the computer system to:

store a new update in the ordered buffer;

apply the new update to one or more items stored in a particular index partition of the plurality of new index partitions when the at least one item was last updated before the new update was applied to the table partition; and remove the new update from the ordered buffer when applying the new update was successful.

18. The non-transitory computer-readable storage medium of claim 13, wherein the instructions further comprise instructions that, as a result of being executed by the one or more processors, cause the computer system to:

store a new update in the ordered buffer;

apply the new update to one or more items when one or more conditions are satisfied; and removing the new update from the ordered buffer when applying the new update was successful.

19. The non-transitory computer-readable storage medium of claim 18, wherein the one or more conditions comprise a most recent update to the at least one item being older than the new update.

20. The non-transitory computer-readable storage medium of claim 13, wherein the database index is a global secondary index.

* * * * *